US005231073A

United States Patent [19]

Cohn et al.

[11] Patent Number: 5,231,073

[45] Date of Patent: Jul. 27, 1993

[54] MICROWAVE/FAR INFRARED CAVITIES AND WAVEGUIDES USING HIGH TEMPERATURE SUPERCONDUCTORS

[75] Inventors: Daniel R. Cohn, Chestnut Hill; Leslie Bromberg, Sharon; Benjamin Lax, Chestnut Hill; Ward D. Halverson, Cambridge; Paul P. Woskov, Charlestown, all of Mass.

[73] Assignee: Massachusetts Institute of Technology, Cambridge, Mass.

[21] Appl. No.: 422,951

[22] Filed: Oct. 18, 1989

Related U.S. Application Data

[62] Division of Ser. No. 121,923, Nov. 18, 1987, Pat. No. 4,918,049.

[51] Int. Cl.[5] .................................... B23B 3/00

[52] U.S. Cl. .................................... 505/1; 505/702; 505/704; 505/728; 505/729; 505/740; 505/741; 264/322; 156/610

[58] Field of Search .................... 505/1, 702, 704, 728, 505/729, 740, 741; 264/322; 156/610, 613, 614

[56] References Cited

U.S. PATENT DOCUMENTS

| | | | |
|---|---|---|---|
| 4,012,293 | 3/1977 | Meyerhoff | 204/9 |
| 4,027,053 | 5/1977 | Lesk | 423/349 |
| 4,329,539 | 5/1982 | Tanaka et al. | 505/887 |
| 4,529,837 | 7/1985 | Borden | 505/887 |
| 4,857,360 | 8/1989 | Halbritter et al. | 427/62 |
| 4,883,686 | 1/1989 | Doehler et al. | 505/1 |
| 4,921,833 | 5/1990 | Takano | 505/704 |
| 4,965,247 | 10/1990 | Nishiguchi | 505/702 |

OTHER PUBLICATIONS

Wu et al, "The Josephson Effect in a Ceramic Bridge at Liquid Nitrogen Temperatures", Jap. Jour. of Applied Physics, vol. 26, No. 10, Oct. 1987 pp. L1519–L1580.

Chaudhari et al, "Quantum Interference Devices Made From Superconducting Oxide Thin Films", Appl. Phys. Lett. 51(3) Jul. 20, 1987, pp. 200–202.

Moriwaki et al, "Electrical Properties of Superconducting $(La_{1-x}Sr_x)_2CuO_4$" High Temperature Superconductors, MRS Apr. 23–24, 1987.

Enomoto, et al, "Largely Anisotropic Superconducting Critical Current in Epitaxially . . . ", Jap. Jour. of Appl. Phys. vol. 26, No. 7 Jul. 1987 pp. L1248–L1250.

*Primary Examiner*—Robert Kunemund
*Attorney, Agent, or Firm*—Choate, Hall & Stewart

[57] ABSTRACT

The structures for confining or guiding high frequency electromagnetic radiation have surfaces facing the radiation constructed of high temperature superconducting materials, that is, materials having critical temperatures greater than approximately 35° K. The use of high temperature superconductors removes the constraint of the relatively low energy gaps of conventional, low temperature superconductors which precluded their use at higher frequencies. The high temperature superconductors also provide larger thermal margins and more effective cooling. Devices which will benefit from the structures of the invention include microwave cavities, millimeter-wave/far infrared cavities, gyrotron cavities, mode converters, accelerators and free electron lasers, and waveguides.

11 Claims, 4 Drawing Sheets

MICROWAVE/FAR INFRARED CAVITIES AND WAVEGUIDES USING HIGH TEMPERATURE SUPERCONDUCTORS

This is a divisional of application Ser. No. 07/121,923, filed Nov. 18, 1987, now U.S. Pat. No. 4,918,049, issued on Apr. 17, 1990.

BACKGROUND OF THE INVENTION

This invention relates to high frequency cavities and waveguides having surfaces in contact with the radiation made of high temperature superconducting materials.

Recently, high temperature superconducting ceramic materials have been discovered whose transition to the superconducting state occurs at temperatures above 35° K. These high temperature superconducting ceramic materials include rare earth elements such as yttrium, lanthanum, and europium combined with barium and copper oxides. A representative high temperature superconducting material is the Y-Ba-Cu-O system. See, J. G. Bednorz and K. A. Muller, *Z. Phys.*, B 64, 189 (1986) and M. K. Wu, J. R. Ashburn, C. J. Torng, P. A. Hor, R. L. Meng, Z. J. Huang, Y. Q. Wang, and C. W. Chu, *Phys. Rev. Lett.* 908 (1987). These materials have critical temperatures of up to approximately 90° K. or above. Of course, this technique can be used for the deposition of all superconductors, not just high $T_c$ superconductors.

Because ohmic power losses can be a major limitation in microwave/far infrared technologies, it would be advantageous to use superconducting materials for cavities and waveguides. Although conventional, low temperature superconducting materials have been used to reduce greatly these ohmic losses in ultrahigh Q cavities at microwave frequencies, there are significant constraints due to operation at liquid helium temperatures. Moreover, photons in the millimeter-wave/far infrared range can cause transitions across the superconducting energy gap, thereby removing the superconducting properties. There are also limitations due to thermal excitations across the gap. For these reasons, conventional superconductors have not been employed for gyrotron cavities, mode converters, accelerators and free electron lasers, and waveguides operating at wavelengths less than approximately one centimeter.

SUMMARY OF THE INVENTION

The structures according to the invention for confining or guiding electromagnetic radiation having wavelengths less than one centimeter down to approximately 10 μm have surfaces facing the radiation covered with superconducting materials having critical temperatures greater than 35° K. The invention may be applied to microwave cavities, millimeter-wave/far infrared cavities, gyrotron cavities, mode converters, accelerators and free electron lasers, and waveguides. The high temperature superconducting materials are applied to the surfaces exposed to radiation by a variety of techniques including sputtering or vapor deposition, including laser evaporation. Both single crystal and polycrystalline coatings may be used. In one aspect of carrying out the invention, the superconducting ceramics are grown on the surface of a small tube made of soluble material. A structural material is deposited around the superconductor and the soluble tube material is dissolved. The tube on which the superconducting ceramic is deposited may have patterns that would be passed on to the superconductor. Another approach is to assemble a device from sections that have been previously coated. Single crystal coatings may be obtained by depositing the superconductors on an etched substrate with well-defined patterns and then shock heating the ceramic superconductor with a short pulse laser to effect separation.

The use of high temperature superconducting materials eliminates the constraints resulting from low energy gaps in conventional superconductors. Furthermore, the high temperature superconductors will provide much greater thermal margin with resulting protection against local heating above the critical temperature. More effective and convenient cooling is possible and higher critical magnetic fields are important in providing an increased range of operation. These features enable improved performance from microwave devices which presently use conventional superconducting materials. Furthermore, they will make possible new applications at microwave frequencies and in the millimeter wave/far infrared range.

DESCRIPTION OF THE PREFERRED EMBODIMENTS

Figure 1:
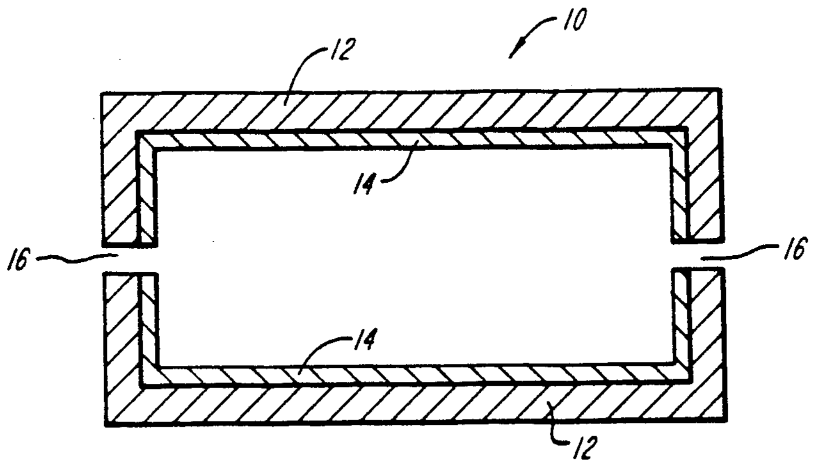
FIG. 1 is a cross-sectional view of a microwave/far infrared cavity.

First of all, the theory on which the present invention is based will be discussed. The surface resistance of conventional, low temperature superconductors described by the BCS model will change from superconducting to normal at photon quantum energies that are sufficient to split a Cooper pair of electrons. The photon energy $E_{photon} = 2\Delta(0) \simeq 3.5\ K\ T_c$ where $\Delta(T/T_c)$ is the superconducting energy gap which depends on the ratio of T, the operating temperature to $T_c$, the critical temperature. For niobium with a critical temperature of 9.5° K., $2\Delta(0)/H \simeq 700$ GHz. Photons with energies that are significantly less than $2\Delta(0)$ can cause transitions to the normal state due to the dependence of the energy gap on the temperature and magnetic field. Conventional low transition temperature superconductors have relatively small energy gaps. The higher transition temperatures of the new superconducting materials imply that they have larger energy gaps. This is the case since if these materials had small energy gaps, thermal excitation of electrons across the gap would cause a transition to a normal state at a lower transition temperature than these materials are known to possess. These materials should therefore remain superconducting when exposed to much higher frequency electromagnetic radiation. Roughly, if there is a pairing energy and associated energy gap in the high temperature superconductors that scales with critical temperature, then materials with a critical temperature of approximately 90° K. would have an order of magnitude larger energy gap than niobium (and about five times greater than $Nb_3Sn$). This increase, combined with a much larger temperature range, would facilitate robust operation at frequencies much higher than presently possible. Electromagnetic radiation having wavelengths on the order of 10 μm can be accommodated.

There is an additional physical effect that impacts on high frequency operation involving conventional superconductors. The surface resistance of superconductors increases with increasing frequency even when the photon energies are very low relative to the gap energy and there are essentially no photon induced transitions across the gap. This increase in surface resistance with frequency can be described with a two fluid model of superconductivity without the presence of a gap. Taking the effect of thermally induced transitions across the gap into account, the surface resistance in the case of photon energies very much less than the gap energy can scale as $R_s \sim f^2/T \exp(-\Delta(T/T_c)/kT) + R_o$ where f is frequency and $R_o$ is residual resistance (which could result, for example, from impurities). The surface resistance therefore increases with reduced gap energy, $\Delta(T/T_c)$, and vice versa. Thus, the higher gap energies of the high temperature superconductors will facilitate high frequency operation. The use of higher frequencies may allow higher electric fields due to reduced multipactoring and field emission electron loading. See, A. Citron, in "Proceedings of the Workshop in RF Superconductivity," ed. M. Kuntze, Kernforschungszentrum Karlsruhe GmbH report KfK 3019, (November 1980). Furthermore, the high critical magnetic field in high temperature superconductors may facilitate operation over a much wider range of conditions than is possible with low temperature superconductors. Higher RF magnetic fields may be permitted, allowing operation with higher power densities and electric fields.

The invention as related to cavities such as microwave cavities and millimeter-wave/far infrared cavities will now be described. Microwave cavities using conventional low temperature superconductors have been employed as particle accelerators, oscillators, high Q filters, and other applications. See, for example, W. H. Hartwig and C. Passow in "Applied Superconductivity," V. L. Newhouse, ed. Academic Press, New York, 1975. The use of superconducting material greatly decreases power loss and provides a very high value of the cavity quality factor Q. Q values of $10^{11}$ have been obtained. The electric field in the cavity is related to Q by $E_{RF} \sim \sqrt{PQ}/f$ where P is the power loss by ohmic heating of the walls. This power is equal to cavity input power minus power coupled out of the cavity. Very high Q is needed in cavities with very large electric fields (e.g. accelerators) in order to maintain power loss and wall loading at acceptable values. As mentioned above, operation with conventional low temperature superconductors is limited by a number of constraints. Use of high temperature superconductors may make possible higher wall loading, higher Q, higher power, and higher electric fields in microwave cavities, as well as providing cooling at much more convenient temperatures.

The operation of millimeter-wave cavity devices using normal conductors can be significantly constrained by high wall loading even when very high electric fields are not required. The wall loading scales as $P_w \sim E_{RF}^2\,{}^{RF}f/QA \sim E_{RF}^2 f^3/Q$ where the wall area, A, scales as $A \sim f^{-2}$ for fixed mode number. Use of high temperature superconductors in millimeter wave/far infrared cavity devices could be important in removing wall loading constraints and/or making possible very high values of Q.

A representative cavity for confining electromagnetic radiation having wavelengths less than one centimeter is shown in FIG. 1. A cavity 10 includes a structural substrate 12 on the inside surface of which is a layer 14 of a high temperature superconducting material having a critical temperature greater than 35° K. Electromagnetic radiation input and output coupling apertures 16 could have a size as large as the full cavity diameter for modes near cutoff. High temperature superconducting material such as Y-Ba-Cu-O and La-Ba Cu-O and others are suitable for the layer 14. An appropriate material is $YBa_2Cu_3O_{7-x}$. The layer 14 of high temperature superconducting material may be coated on the substrate 12 by a variety of techniques including sputtering or vapor deposition, including laser evaporation. Polycrystalline coating may be sufficient if the wall current densities are sufficiently low. For higher wall current densities, a single crystal material may be necessary. For materials with anisotropic superconducting properties such as Y-Ba-Cu-O, it will be advantageous for the Cu-O planes to be deposited parallel to the surface of the cavity. This orientation will provide the highest critical current densities for currents flowing on the surface. See, T. R. Dinger, T. K. Worthington, W. J. Gallagher and R. L. Sandstrom, Phys. Rev. Letters 58, no. 25, 2687 (1987).

A suitable method for making the cavity 10 is to grow the superconducting ceramic on a small tube made of a soluble material, deposit structural material around the superconductor, and finally dissolve the tube material. The tube material may have patterns on its surface that would be passed on to the superconductor. A suitable soluble material for the tube is aluminum or a plastic, and a suitable structural material is copper. Another approach is to assemble the cavity from sections that have been previously coated.

Single-crystal coatings are obtained by a variety of techniques including various evaporation approaches. One is to deposit the superconductors on an etched substrate with well-defined patterns and then shock heating the ceramic superconductor with a short pulse laser to separate the superconductor from the substrate. Regardless of the particular coating process selected, the coating should be applied so that there is good thermal conductivity between it and the substrate, as well as good conductivity in the substrate. A suitable thickness for the coating is several $10^{-6}$ meters.

Liquid nitrogen may be employed for steady state cooling of the cavity 10 if the superconducting material selected has a transition temperature above 77° K., the temperature at which liquid nitrogen boils. It is known that Y-Ba-Cu-O materials have transition temperatures above 77° K. The advantage of cooling at this temperature is that large amounts of heat can be removed by the liquid nitrogen at relatively high efficiencies. Other cooling fluids such as Ne, H, and He may be used if better superconducting properties are required by means of lower temperature operation. Cooling efficiency would, however, be decreased. In any case, the relatively high transition temperature will provide much greater thermal margin than would be the case with low transition temperature superconductors.

Cooling could also be achieved by using $N_2$, Ne, H, or He supercooled gas inside the cavity. Advantages of this include direct contact of the cooling fluid with the superconductor surface and displacement of the atmosphere which would eliminate electromagnetic radiation absorption losses.

A high frequency cavity application of the present invention is in high power gyrotrons. A gyrotron produces high power millimeter-wave radiation by bunching of an electron beam in a copper resonant cavity subjected to a magnetic field. When the electron cyclotron resonance frequency is approximately equal to characteristic frequency of the cavity, energy can be transferred from the beam to cavity radiation (for 140 GHz the D.C. magnetic field for first harmonic operation is ~5T). Cavity wall loading can be the dominant limitation on the amount of power that can be produced in a CW device, particularly in high frequency (>100 GHz) tubes which use compact cavities in order to provide a sufficiently thin mode spectrum for operation in a desirable single mode.

This constraint can be alleviated by use of a high temperature superconductor resonantor. Even if the superconducting resonantor wall material has a relatively high surface resistance and an ultra high Q is not attained, a large increase in $\sigma$ relative to $\sigma_{copper}$ could substantially reduce the wall loading and increase the allowed gyrotron power output. ($Q_{ohmic} \sim a/\delta \sim af^{\frac{1}{2}}\sigma^{\frac{1}{2}}$, where a is the cavity radius, $\delta$ is the skin depth and $\sigma$ is the conductivity.) For example, an increase in $\sigma$ by 100 times relative to copper would reduce the wall loading by a factor of 10.

However, the presence of the large D.C. magnetic field in the gyrotron resonator could result in a very large increase in the surface resistance of the superconductor, and a large decrease in $Q_{ohmic}$. This has been observed in present microwave cavities. See, P. Kneisel, O. Stoltz and J. Halbritten, IEEE Trans. NS-18, 158(1971). Experimental determinations of the millimeter-wave/far infrared surface resistivity of high temperature superconductors in this environment are critical for this application.

Figure 2:
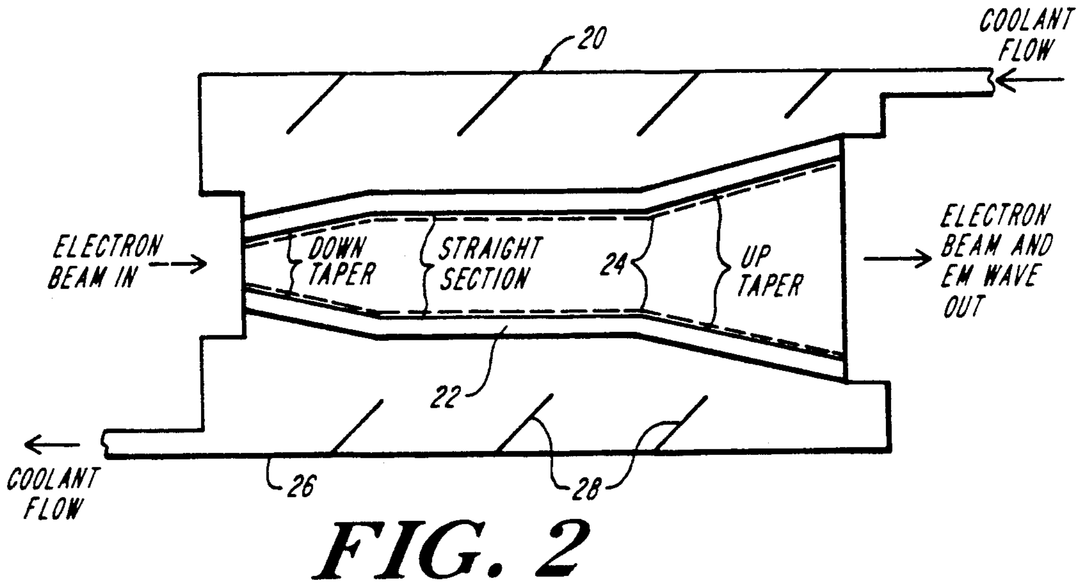
FIG. 2 is a cross sectional view of a gyrotron resonator.
Figure 3:
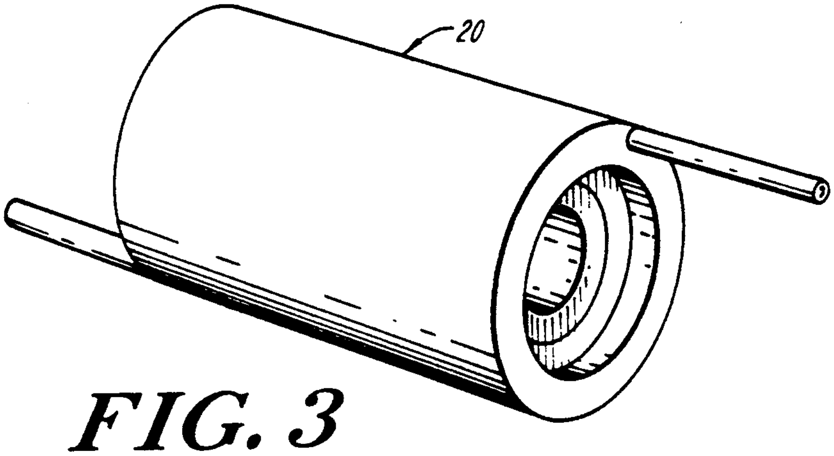
FIG. 3 is a perspective view of the gyrotron resonator of FIG. 2.

A schematic drawing of a gyrotron resonator 20 is shown in FIG. 2. The dimensions of the gyrotron resonator 20 will depend on the frequency and mode of operation. A $TE_{03}$, 140 GHz resonator would have an internal diameter of 7 mm, for example. FIG. 3 is a perspective view of the resonator 20 illustrating its cylindrical symmetry. The resonator 20 includes a substrate 22 having good thermal conductivity. A suitable material is copper. A layer 24 of a high temperature superconducting material such as Y-Ba-Cu-O is applied to the substrate 22. A coolant jacket 26 surrounds the substrate 22 and may include baffles 28 within the coolant jacket 26 to insure uniform coolant flow. The coolant jacket 26 may extend beyond the ends of the substrate 22 to insure uniform cooling and to provide an interface for input and output components.

Figure 4:
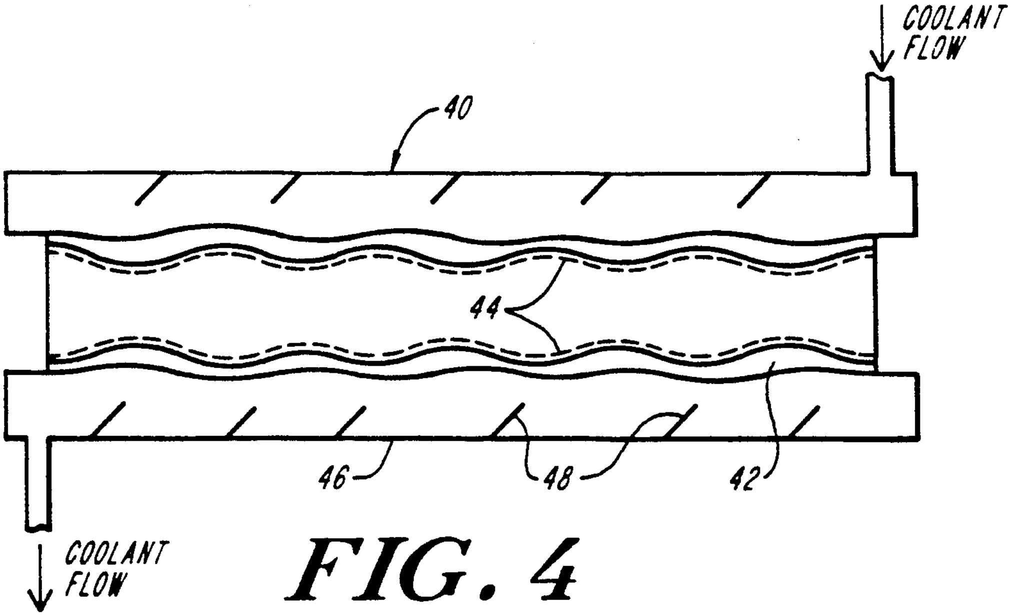
FIG. 4 is a cross sectional view of a circular waveguide mode converter.
Figure 5:
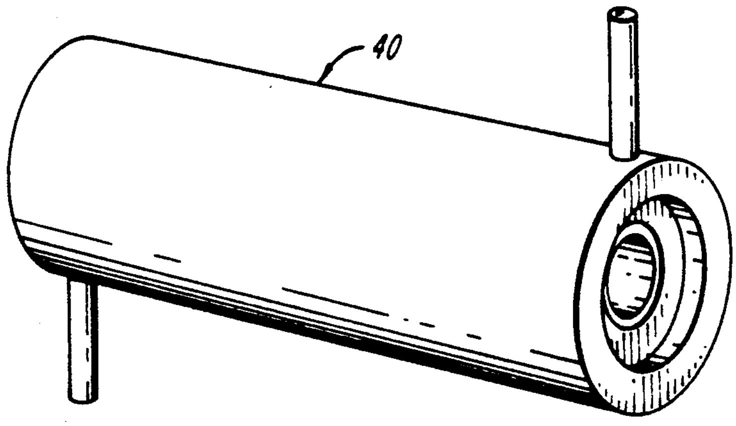
FIG. 5 is a perspective view of the mode converter of FIG. 4.

FIGS. 4 and 5 show a mode converter 40. Mode converters are generally required to convert source (e.g. gyrotron) output to a linearly polarized beam peaked on axis. Such spatial beam qualities are necessary for many applications including electron cyclotron resonance heating in plasmas, plasma diagnostics, and possible application to radar and communications. Keeping the resonator dimensions as small as possible with superconducting materials will facilitate mode converter design by minimizing source output mode order.

Use of superconducting materials in the waveguide mode converters themselves can also lead to significant improvements. Eliminating or reducing the ohmic losses in these converters would make possible very compact designs at high frequencies. Efficiencies would be improved not only because of lower ohmic losses, but also because mode conversion to unwanted higher order modes would be reduced with smaller guide dimensions. Peak power handling capabilities can be maintained by including the compact converters in the high vacuum system of the gyrotron.

An illustrative design for a superconducting symmetric mode, $TE_{on'} \rightarrow TE_{on}$ circular mode converter 40 is shown in FIG. 4 and FIG. 5, FIGS. 6 and 7 show a design for a $TE_{01} \rightarrow TE_{11}$ circular guide converter. With reference to FIGS. 4 and 5, the waveguide mode converter 40 has an axisymmetric sinusoidal internal diameter ripple given by $a(z)=a[1+\eta\sin(2\pi z/L)]$ where a is the mean radius, $\eta$ is the relative ripple amplitude, L is the beat wavelength between the $TE_{on'}$ and $TE_{on}$ modes, and z is the position along the length of the converter 40. The waveguide mode converter 40 includes a substrate 42 including a superconducting coating 44. The substrate 42 is surrounded by a cooling jacket 46 which may include optional baffles 48.

Figure 6:
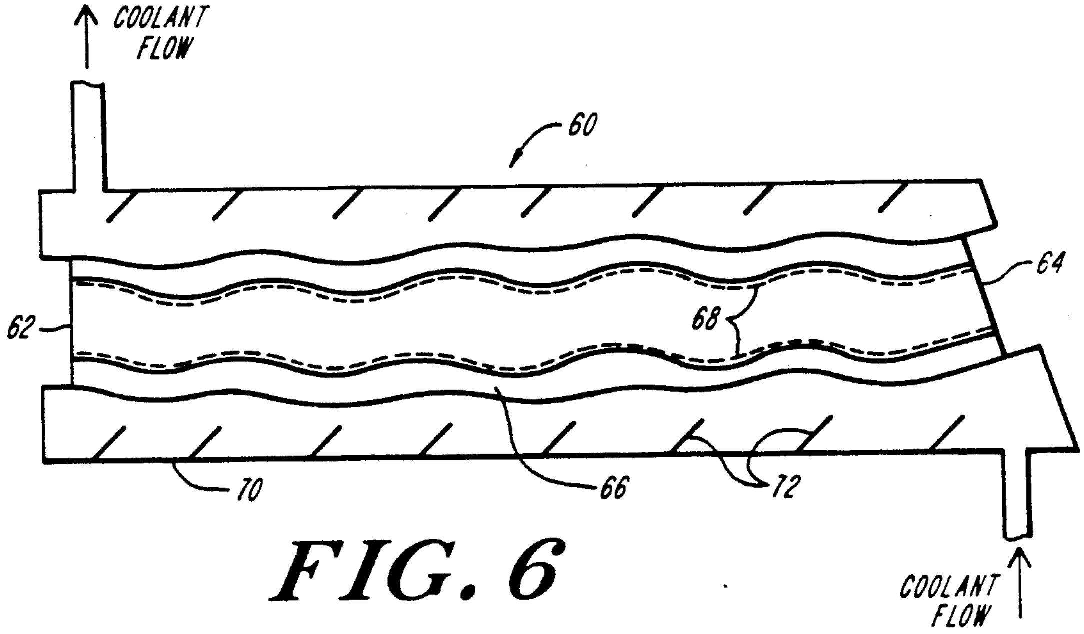
FIG. 6 is a cross-sectional view of another circular waveguide mode converter.
Figure 7:
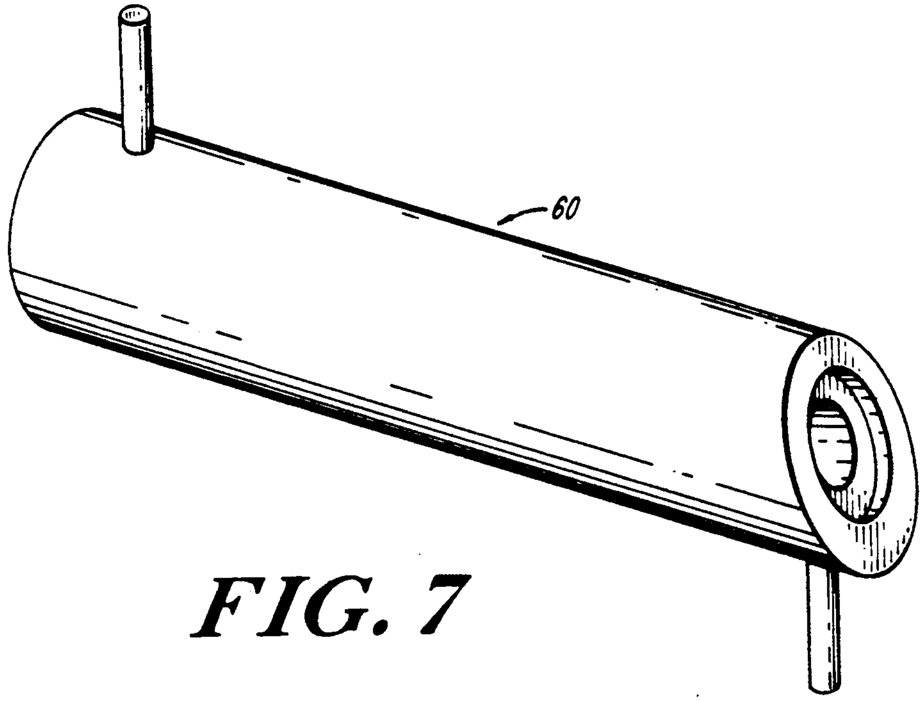
FIG. 7 is a perspective view of the mode converter of FIG. 6.

With reference to FIGS. 6 and 7, a superconducting $TE_{01} \rightarrow TE_{11}$ circular guide converter 60 has a wriggle or snake-like deformation of the converter axis of the form $y=a\eta\sin(2\pi z/L)$ where y is the deviation of the axis, a is the internal guide radius, $\eta$ is the amplitude of the deformation, L is the beat wavelength between the $TE_{01}$ and $TE_{11}$ modes, and z is the position along the axis. The input and output ends 62 and 64 are not parallel to one another because the converter is an odd multiple of $\frac{1}{4}$ wavelengths long. Choosing such a length improves conversion efficiency by suppressing the competing $TE_{21}$ mode. As in the earlier embodiments, a substrate 66 has a superconducting coating 68. The substrate 66 is surrounded by a cooling jacket 70 which extends beyond the ends 62 and 64. Optional baffles 72 may be included within the cooling jacket 70 to improve flow.

The use of quasi-optical mode converters could also be facilitated with superconducting gyrotron resonators. Quasi optical mode converters have been shown to work well in transforming gyrotron radiation generated in whispering gallery modes, $TE_{mp}$, where m is much greater than one and p equals one. Gyrotron operation in such modes is also advantageous for minimizing mode competition since the electron beam is propagated near the surface of the resonator and does not excite the more closely spaced volume modes. However, whispering gallery modes have ohmic losses with conventional conductors that make such gyrotrons impractical at very high frequencies. Ohmic Q is given as $Q_{ohmic}=a/\delta(1-m^2/\nu^2mp)$ where $\nu_{mp}$ is the pth zero of the $J'_m$ Bessel function and m and p are the mode indices. High temperature superconducting materials would improve prospects for this type of gyrotron in the submillimeter-wavelength range by significantly decreasing the skin depth $\delta$ to offset small radius and large m number.

The main application of present superconducting cavities is in RF accelerators with ultra high values of Q (on the order of $10^{10}$). The use of high temperature superconductors would improve present microwave cavity performance and facilitate operation at higher frequencies. It is important to the next generation of Terawatt particle accelerators to operate at higher frequencies for increased acceleration gradient to keep size and cost within practical limits. Improved RF linacs could also affect free electron laser development. Another application could be in the development of electromagnetic wave wigglers using millimeter-wave cavities for free electron lasers.

Supercondcting waveguides could also be developed using the approaches described above. This could be useful in the millimeter-wave range where present copper fundamental mode guides are very lossy. Low order mode operation in overmoded guide is usually employed to reduce ohmic losses. Overmoded operation, however, has the disadvantages of the possibility of mode conversion leading to increased loss and dispersion. Prevention of mode conversion can constrain tolerances and increase the difficulty of implementation since unplanned bends must be avoided. WR-7 fundamental waveguide of transmitting 110-170 GHz has rectangular dimensions of $1.65\times0.81$ mm with conventional conductor losses of 6 dB/m at 140 GHz. At higher frequencies dimensions become smaller and ohmic losses are more severe. The performance of these guides would be substantially improved by using superconducting coatings. The power loss for a given waveguide scales directly with the surface resistance. Thus improvements of orders of magnitude in power loss could be in principle possible.

Dispersion in fundamental waveguides can constrain allowed bandwidth and limit some applications. Moreover, as frequency increases, construction of fundamental guide becomes more difficult. Superconducting overmoded guides may be useful for very high frequency operation (>200 GHz) where losses can be significant even for low order modes. Dispersion can be low for low order modes in overmoded guides if mode conversion is controlled. The absence of low energy gaps should make possible operation at frequencies greater than 1 Terahertz. As a rough estimate, scaling the energy gap according to (1) leads to a projected gap frequency >5 Thz for a critical temperature of $\sim$90° K.

The development of waveguides using superconducting coatings could facilitate the use of millimeter wave communications with its advantages of high bandwidth and very sensitive receivers. Use of these guides could also significantly improve the front end performande of millimeter-wave receivers used in radar, communications, and radio astronomy.

Both rectangular and circular waveguides could also be developed. The rectangular waveguide configuration could have the advantage that it might be easier to coat single crystal films on it. One possible approach for cooling would be to use helium gas inside the guide to serve the dual function of cooling and preventing absorption of millimeter-wave radiation. Other types of transmission systems, such as striplines and H-guides, could also benefit from the capability of much higher frequency operation (>1 Terahertz).

Figure 8:
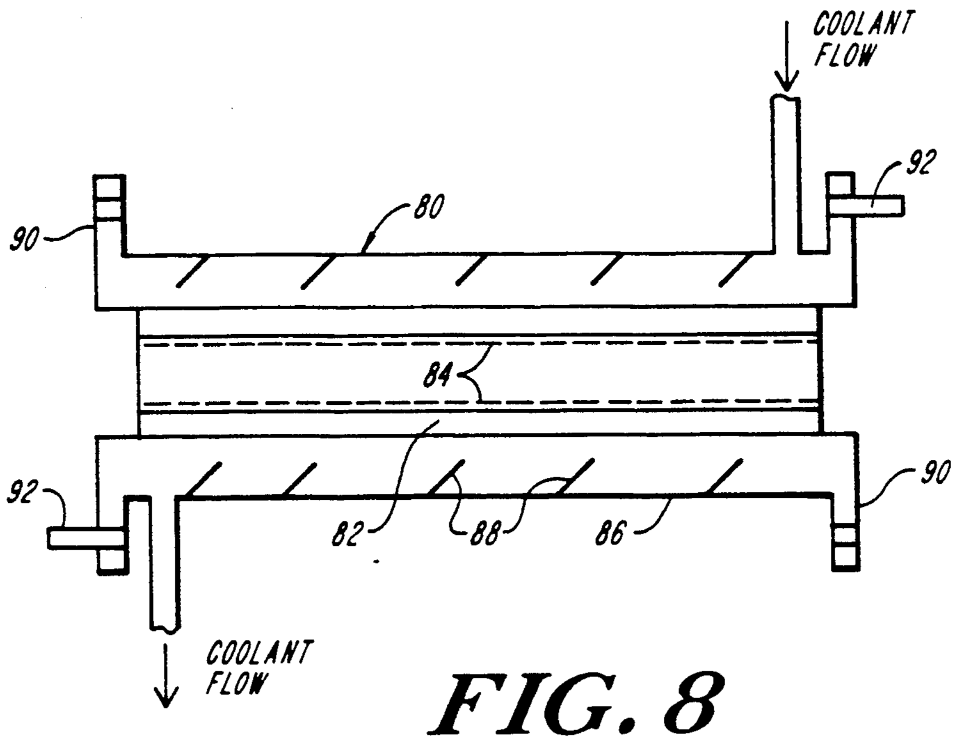
FIG. 8 is a cross-sectional view of a superconducting millimeter waveguide.
Figure 9:
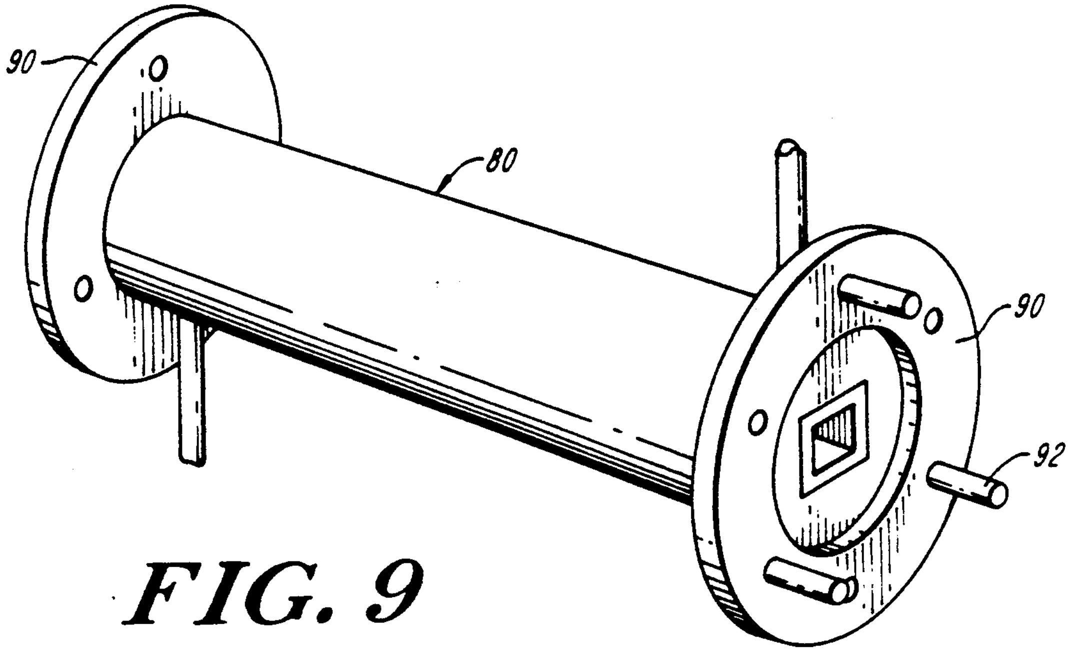
FIG. 9 is a perspective view of the millimeter waveguide of FIG. 8.

FIGS. 8 and 9 show an illustrative design for a superconducting millimeter waveguide 80. A straight waveguide 80 is shown here. However, many other millimeter-wave components such as bends, waveguide transitions, power dividers, etc., could be coated with superconducting material and enclosed in a coolant jacket similar to the straight guide shown here. In particular, the superconducting millimeter waveguide 80 includes a substrate 82 having a high temperature superconductor coating 84. The substrate 84 is surrounded by a coolant jacket 86 having optional baffles 88. Flanges 90 including alignment pins 92 are provided for attachment purposes. As shown in FIG. 9, the waveguide 80 has a rectangular cross section. However, the cross section may be circular as well.

The structures disclosed herein for confining and guiding electromagnetic radiation having wavelengths less than one centimeter include surfaces exposed to the radiation made of high temperature superconductivity materials. The relatively small scale applications disclosed herein do not require electrical contacts, special materials interfacing as in semiconductor devices, or special structural support. Coatings of Y-Ba-Cu-O high temperature superconducting materials are preferred, but any superconducting material having a transition above 35° K. will be suitable. The structures set forth herein are entirely exemplary and it is intended that the appended claims cover any structures for confining and guiding electromagnetic radiation of wavelengths less than one centimeter.

What is claimed is:

1. Method for making a superconducting structure for confining or guiding electromagnetic radiation having wavelengths in the range of approximately 10 micrometers to 1 centimeter, said structure having surfaces exposed to the radiation and said surface being covered with ceramic superconducting materials having critical temperatures greater than 35 degrees Kelvin, comprising:

growing the ceramic superconducting materials on a tube of soluble material by sputtering the materials on the tube;

depositing structural material on the superconducting materials; and dissolving the tube material.

2. Method for making a superconducting structure for confining or guiding electromagnetic radiation having wavelengths in the range of approximately 10 micrometers to 1 centimeter, said structure having surfaces exposed to the radiation and said surfaces being covered with ceramic superconducting materials having critical temperatures greater than 35 degrees Kelvin, comprising:

growing the ceramic superconducting materials on a tube of soluble material by vapor deposition of the materials on the tube;

depositing structural material on the superconducting materials; and dissolving the tube material.

3. Method for making a superconducting structure for confining or guiding electromagnetic radiation having wavelengths in the range of approximately 10 micrometers to 1 centimeter, said structure having surfaces exposed to the radiation and said surfaces being covered with ceramic superconducting materials having critical temperatures greater than 35 degrees Kelvin, comprising:

growing the ceramic superconducting materials on a tube of soluble material by vapor deposition via laser evaporation of the materials on the tube;

depositing structural material on the superconducting materials; and dissolving the tube material.

4. The method of any of claims 1, 2, or 3 wherein the step of growing the ceramic superconducting materials comprises growing the superconducting material La-Ba-Cu-O.

5. The method of any of claims 1, 2, or 3 wherein the step of growing the ceramic superconducting materials comprises growing the superconducting material Y-Ba-Cu-O.

6. The method of claim 5 wherein the step of growing the superconducting material Y-Ba-Cu-O comprises growing the Y-Ba-Cu-O material in a prespecified orientation such that Cu-O planes of the Y-Ba-Cu-O material are parallel to said surfaces covered by the Y-Ba-Cu-O.

7. The method of any of claims 1, 2, or 3 wherein the step of growing the ceramic superconducting materials comprises growing said materials on a tube comprised of aluminum.

8. The method of any of claims 1, 2, or 3 wherein the step of growing the ceramic superconducting materials comprises growing said materials on a tube comprised of plastic.

9. The method of any of claims 1, 2, or 3 wherein the step of depositing structural material comprises depositing copper.

10. The method of any of claims 1, 2, or 3 wherein the tube includes patterns which are passed on to the superconducting material.

11. A method for making a superconducting structure for confining or guiding electromagnetic radiation comprising:

depositing a single crystal coating of ceramic superconducting material on an etched substrate with well-defined patterns; and shock heating the ceramic superconductor with a short pulse laser to separate the single crystal superconductor from the substrate.

* * * * *

UNITED STATES PATENT AND TRADEMARK OFFICE

CERTIFICATE OF CORRECTION

PATENT NO. : 5,231,073
DATED : July 27, 1993
INVENTOR(S) : Daniel R. Cohn, et al.

It is certified that error appears in the above-indentified patent and that said Letters Patent is hereby corrected as shown below:

Column 6, line 18: delete "$TE_{on}$," and insert therefor -- $TE_{on1}$ --;
Column 6, line 25: delete "$TE_{on}$," and insert therefor -- $TE_{on1}$ --; and
Column 7, line 52: delete "performande" and insert therefor -- performance --.

Signed and Sealed this

Seventh Day of June, 1994

Attest:

BRUCE LEHMAN

Attesting Officer

*Commissioner of Patents and Trademarks*